United States Patent [19]

Nelson, Jr. et al.

[11] 4,330,511
[45] May 18, 1982

[54] TREATMENT OF BLAST FURNACE OFF-GAS

[75] Inventors: Theodore W. Nelson, Jr., Glen Ellyn; David B. Corkle, River Forest; Joel Z. Wolfe, Bloomingdale; Larry A. Ganzel, Western Springs, all of Ill.

[73] Assignee: Peter F. Loftus Corporation (Illinois), Chicago, Ill.

[21] Appl. No.: 131,066

[22] Filed: Mar. 17, 1980

[51] Int. Cl.³ .................... B01D 53/34; C21B 7/22
[52] U.S. Cl. ............................ 423/210; 423/1; 423/215.5; 55/68; 55/228; 210/687; 210/688; 210/749; 210/767; 266/147; 266/157
[58] Field of Search ............ 423/1, 42, 92, 104, 423/210 R, 210 M, 238, 239, 215.5; 55/68, 85, 89, 84, 421, 227–229; 75/25, 41 R; 210/38 R, 73 R, 53, 54, 193, 687, 688, 749, 767; 266/144, 146, 147, 157

[56] References Cited

U.S. PATENT DOCUMENTS

| | | | |
|---|---|---|---|
| 2,877,086 | 3/1959 | Mackay | 423/215.5 |
| 3,315,443 | 4/1967 | Marino | 55/85 |
| 3,396,514 | 8/1968 | Hurst et al. | 266/147 X |
| 3,704,570 | 12/1972 | Gardenier | 55/84 |
| 3,788,983 | 1/1974 | Fries | 210/37 X |
| 3,931,007 | 1/1976 | Sugano et al. | 210/52 X |
| 4,012,318 | 3/1977 | Hayashi | 210/28 |
| 4,098,690 | 7/1978 | Semmens | 210/38 R |

OTHER PUBLICATIONS

Development Document for Proposed Effluent Limitation Guidelines and Standards for the Iron and Steel Manufacturing, Point Source Category, vol. 8, EPA Development Document 440/1-79/0242, Oct. 1979, pp. 264-308.

*Primary Examiner*—Earl C. Thomas
*Attorney, Agent, or Firm*—Fitch, Even, Tabin, Flannery & Welsh

[57] ABSTRACT

Off-gas produced by a blast furnace is treated by scrubbing and cooling the gas with water and then settling solids from the liquid effluent. The liquid effluent is cooled following settling, and a major portion of the cooled effluent is recirculated for another pass through the scrubbing and cooling steps. The remainder of the effluent is chemically treated, and heavy metals are precipitated and settled as sludge. The clarified effluent is filtered and then treated with a cation exchange resin in a sodium cycle. A substantial part of the ion-exchange-treated effluent is returned to the scrubbing and cooling steps, and another substantial part is discharged as blowdown. Return of water which is of adequate quality to prevent scaling significantly reduces the make-up requirements. By discharging the ion-exchange-treated effluent to blowdown while ammonium ions are being removed from solution by a given charge of ion-exchange resin, the standards for maximum blowdown discharge of ammonia are satisfied. Reduced blowdown results in an accompanying reduction in the discharge of the other toxic contaminants.

17 Claims, 2 Drawing Figures

TREATMENT OF BLAST FURNACE OFF-GAS

The invention relates generally to the treatment of the off-gas from a blast furnace or the like, and more particularly to methods and systems for treatment of scrubbing and cooling water from such gas treatment which reduces discharges in a manner to meet environmental standards.

BACKGROUND OF THE INVENTION

Heretofore, off-gas produced from a blast furnace is passed first through a primary cleaning device of the dustcatching variety for coarse particle removal and is then routed to secondary gas scrubbing and cooling devices. Following the cleaning and cooling, the off-gas is suitable for combustion in the air-heating section of a blast furnace and is often employed as a supplemental fuel therefor. The characteristics of off-gas vary depending upon the particular design of the furnace, its size and the particular operation being carried out.

A medium-sized blast furnace producing about a million tons a year of output is considered representative, and it might typically discharge 270,000 standard cubic feet per minute (scfm) of off-gas having a temperature between about 300° F. (149° C.) and 450° F. (232° C.) at a pressure of about 30 psia. In such an installation, gas cleaning is often accomplished using a venturi scrubber/separator to which water is supplied at a rate of about 10 gallons per minute (gpm) for each 1,000 scfm of off-gas. Accordingly, about 2700 gallons of water are being pumped to the venturi scrubber each minute of operation. Particulate matter and other contaminants carried in the off-gas stream are transferred to the scrubber water, and the exiting water stream may have a temperature of between about 115° F. (46° C.) and 155° F. (68° C.) and contain between 1,000 and 3,000 milligrams per liter (mg/l) of suspended solids.

In addition to the suspended material, the exiting scrubber water may representatively contain ammonia at a level of about 15 to 80 mg/l, phenol at about 0.05 to 0.3 mg/l and cyanide at a level of about 0.2 to 30 mg/l.

After scrubbing, the gas is commonly passed through a partially packed tower where it is subjected to countercurrent water flow which further lowers its temperature to about 95° F. (35° C.). Water may be supplied to such gas coolers at a rate of about 20 gpm/1,000 scfm of off-gas, i.e. about 5400 gpm. The exiting water may have a temperature of about 105° F. (41° C.) to 125° F. (52° C.), and it is fairly clean—having relatively minor amounts of particulate matter and low concentrations of ammonia, phenol and cyanide. Optionally, the off-gas may be further treated in precipitators, producing a discharge stream of water containing minor amounts of particulates and other contaminants.

The dirty scrubber water has generally been piped to a settling device, such as a clarifier or thickener, which separates the solids from the water as sludge. The sludge in slurry form is then de-watered, and the solids may be reprocessed with the sinter for recycle to the blast furnace. The clarified scrubber water and the gas cooler water are usually cooled and recycled. It is also acceptable to cascade a portion of the effluent from the gas cooler directly to the venturi scrubbers.

As the United States has become more concerned with environmental considerations, recycling of the cooling and scrubbing water has been required in order to reduce pollution. Contaminants which are contained in the effluent include heavy metals, phenols, cyanides, ammonia and fluorides, which are transferred to the water from the off-gas and the particulate matter. Generally, the recycling system is evaporative in nature because evaporative-type cooling towers are used, and thus there is a tendency to concentrate dissolved materials. It is well known that calcium and magnesium ions, as well as sulfate ions, upon concentration, give rise to mineral scaling and that to maintain adequate water quality for a recirculation stream some purging is necessary—the amount of water purged being referred to as "blowdown". Discharge of some water or blowdown is considered to be an economic necessity. Makeup water is necessary to replace both the amount purged and the amount which evaporates, and it is necessary to take into consideration the characteristics of the makeup water and the blast furnace gas system in order to properly balance blowdown, evaporation and makeup so as to control mineral scaling.

The rates of makeup, blowdown and evaporation have been used to define a parameter known as "cycles of concentration" which refers to a multiplier that, when applied to a constituent concentration in the makeup, produces a product which equates to the expected concentration of that constituent in the recirculation flow (and also in the blowdown). The levels of calcium and magnesium ions in the recycle stream increase in accordance with the above ratio and also because of transfer of matter from the off-gas to the water.

Effluent standards in the United States which apply to blast furnace systems regulate blowdown predicated upon the amount of iron produced in the blast furnace. Accordingly, the allowable number of pounds of a specific contaminant which can be discharged to the environment is based upon the production rate of iron, i.e., pounds of contaminant per 1000 pounds of iron produced. More stringent standards have been proposed, and it does not appear that many of these standards can be achieved simply by additional recycling and further limiting of blowdown. Such an attempt to simply increase the cycles of concentration in the recycled system would yield a water quality that would result in severe mineral scaling. Accordingly, improved methods for the treatment of the water in an off-gas cleansing system are needed, particularly in order to meet the proposed more stringent standards.

BRIEF SUMMARY OF THE INVENTION

It has been found that a side-stream portion of the water being recycled can be further treated to produce a first stream acceptable for return to the primary recirculation stream and a blowdown stream which meets the more stringent quality standards, while still achieving the dissolved solids rejection of blowdown. This side stream is first chemically treated to precipitate heavy metals and is then filtered before being treated with a cation exchange resin operating in a sodium cycle. By utilizing several ion-exchange units in parallel, it is possible to use the resin to remove ammonium ions during an early stage of the ion exchange cycle after the resin material has been regenerated. By staging the ion exchange units, the effluent from one unit can be discharged to blowdown when the unit is effectively absorbing ammonium ions, while the effluent from another ion-exchange unit which is in a later stage is directed to the recirculation stream. The system also allows for an increase of the system cycles of concentration without a linear increase in toxics.

DETAILED DESCRIPTION OF THE PREFERRED EMBODIMENTS

Figure 1:
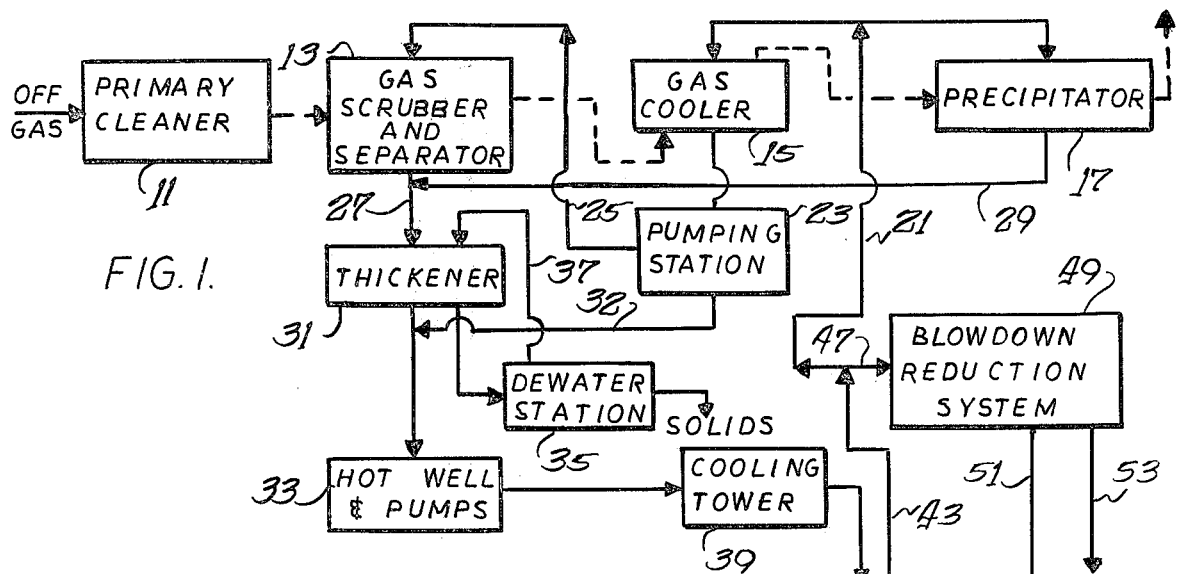
FIG. 1 is a flow diagram of an off-gas processing system for a blast furnace wherein water is circulated and subjected to blowdown reduction.

Off-gas from a blast furnace is first passed through a primary cleaning device 11 which effects coarse particle removal. This may be a cyclone from which particulates settle or are otherwise appropriately separated from the gas, or it may be a dust-pocket or collector-type catcher utilizing conventional dust-recovery principles.

Next, the off-gas is subjected to scrubbing in a scrubbing tower 13 which may have a plurality of spray nozzles or swirl jets to mix the scrubber water with the gas. This scrubbing station preferably also includes at least one venturi-type scrubber section, which is effective to control the pressure differential across the venturi throat and thereby help regulate the back pressure in the blast furnace itself. After coarse particles have been removed and the off-gas has been scrubbed, it is generally directed to a gas cooler 15 wherein it flows countercurrent to water flow, for example in a partially packed tower, where the temperature of the gas may be lowered to about 95° F. Thereafter, it may optionally be passed through an expansion turbine to recover some useful work from the potential energy of the hot gas, and further cleaning may be carried out in a precipitator 17 or the like which may utilize a fine spray of water. Ultimately, the cleaned and cooled off-gas is returned to the combustion chamber of the blast furnace stoves or some other heating process to recover the residual heat value of components of the gas.

Water for the operation is provided through a supply line 21 that splits; and a minor portion of the water flow goes to the precipitator 17, whereas a major portion of the flow goes to the top of the gas cooler 15. The water leaving the gas cooler 15 which may have a temperature in the range of 105° to about 125° F. flows to a sump 23. Many variations exist, and gas cooling and scrubbing water may be recycled in two separate systems or may be supplied in parallel from a singular system. The water in the sump 23 has picked up some solids from the gas in the cooler; however it is still relatively clean.

The water is pumped from sump 23 through line 25 leading to the scrubber 13, including the venturi section thereof, and it exits therefrom through a line 27. The dirty scrubber water exiting through the line 27 may have a temperature in the range of 115° to 155° F. and will generally contain between about 1000 and 3000 mg/l of suspended solids plus dissolved ammonia, phenols and cyanides in the amounts hereinbefore indicated. Still other contaminents are transferred to the off-gas to the scrubber water, many of which degrade water quality. The discharge from the gas scrubber 13 merges with the discharge from the precipitator 17 flowing through a line 29, and both are fed to a settling tank or thickener 31. Effluent from the thickener 31 merges with a side stream 32 from the pumping station 23 and is directed to a hot well 33 which includes pumps. A slurry from the bottom of the thickener 31 is dewatered at a station 35, and the liquid is returned to the thickener through a line 37. The solids may be reprocessed with the sinter for recycle to the blast furnace.

The water from the hot well 33 is pumped to a cooling tower 39 wherein evaporative cooling may lower the temperature of the water to about 95° F. (35° C.) from about 125° F. (52° C.). The cooled water is collected in a sump at a pumping station 41 for recirculation through a line 43 leading to the supply line 21 for another pass through the system. Makeup water is added to the pumping station 41 through the inlet line 45 to make up for losses throughout the system. Optionally, the makeup water could be added to the sump 23 just prior to the pumping of the water to the scrubber 13.

The exit stream from the pumping station 41 is split, and the major portion, e.g., about 92 to about 97% by volume, of the flow is directed to the supply line 21 to the gas-cleaning system. A minor portion, about 3 to about 8%, is separated as a side stream and directed through a line 47 to a blowdown reduction system 49. A very substantial portion of the effluent from the blowdown reduction system 49 is returned to the pumping station 41 through a return line 51, while most of the remainder is discharged through a line 53 as blowdown to a suitable stream or other body of water. It is this blowdown discharge which must meet the environmental standards which have been set and which will be raised in 1984 in the U.S.

Figure 2:
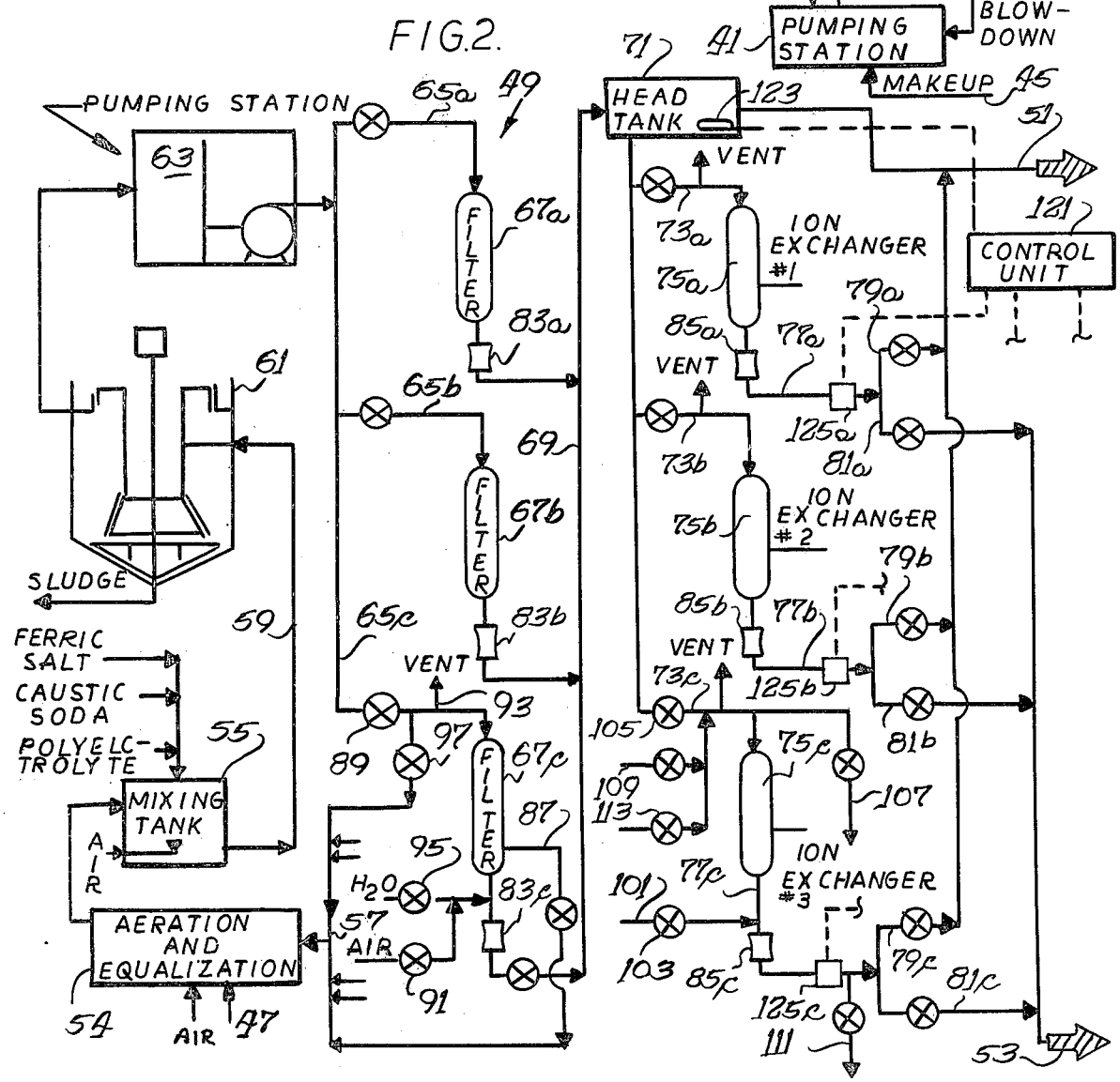
FIG. 2 is a flow diagram showing a blowdown reduction system suitable for use in the system of FIG. 1.

The blowdown reduction system 49 is shown in detail in FIG. 2 wherein the side stream 47 from the the pumping station 41 enters an aeration and equalization tank 54 prior to its flow to a mixing tank 55 where it is mixed with certain chemicals. The provision of the tank 54 facilitates blending of the side stream 47 with smaller streams from other locations within the blowdown system, to be described hereinafter, which are jointly supplied via a manifold pipe 57, and it also allows residual $CO_2$ gas to be stripped from the wastewater which would otherwise cause the precipitation of calcium carbonate thereafter. The chemicals supplied to the mixing tank 55 may include caustic soda (NaOH) or some other alkali metal hydroxide, a soluble ferric compound such as ferric chloride, and an agglomerating or flocculating aid, often referred to as a polyelectrolyte. The tanks 54 and 55 may use any suitable type of agitation, such as a rotating mechanical impeller or a bubble dispersion head to which air under pressure is supplied.

The mixing tank 55 discharges through a line 59 to one or more clarifiers 61 of suitable design wherein agglomeration of suspended solids takes place, together with the precipitation of heavy metals, such as zinc, lead and copper, as insoluble hydroxide compounds. Complex insoluble cyanides are also produced from reaction with the ferric salt, preferably ferric chloride. Sufficient caustic soda is added to reduce the heavy metals concentration in the stream 53 that is ultimately discharged as blowdown to a satisfactory level.

The caustic soda is also employed to adjust the pH of the water to between about 8.5 and 9.5 and preferably to about 9.0. This step accomplishes a pre-softening of the stream 47 which effects precipitation of some magnesium and calcium in the clarifier 61 in the form of the hydroxides, and the presence of the ferric salt aids in coagulation of the precipitated solids. Sufficient polyelectrolyte is supplied so that effluent from the clarifier contains not more than about 20 mg/l of suspended solids. Sludge from the clarifier 61 may be dewatered at this location or combined with the sludge from the thickener 31. Effluent from the clarifier 61 is directed to a pumping station 63 from which it is subsequently delivered through lines 65a, 65b, 65c, to one of a plurality of filtering devices 67a, 67b, 67c, connected in parallel. The filtering devices 67 are preferably deep bed filters using a suitable filtration medium, such as sand and/or anthracite coal, to remove even finer particles of suspended solids that might progress past the clarifier 61. Effluent from the filters 67 is combined in a line 69 which leads to a head tank 71.

The filtered water from the head tank 71 flows through three parallel lines 73a, 73b, 73c, which lead to ion-exchange units 75a, 75b, 75c, which are arranged also in parallel. The ion exchange units 75 employ a cationic ion-exchange resin which operates in the sodium cycle, preferably a strong acid cation resin, such as Amberlite No. 200, and respectively discharge through exit lines 77a, 77b, and 77c. Each of the discharge lines 77 is branched, and the upper branches 79a, 79b, and 79c lead to the return line 51 (which was earlier described) leading to the recirculation pumping station 41. Lower branch lines 81a, 81b, and 81c lead to the line 53 which is discharged as blowdown.

The piping to all of the filter units 67 is the same as that shown with respect to unit 67c; however, the complete piping is only illustrated for that unit. Likewise, the piping to all three of the ion-exchange units 75 is the same as that shown for ion-exchange unit 75c but is only illustrated for that unit. Obviously, the particular number of units, both filter units 67 and ion-exchange units 75, that are employed is dependent upon the overall treatment capacity of the system 49 and upon the individual capacity of the units. More or less than three filter units 67 may be employed; however, at least three ion-exchange units 75 are preferably employed so that one can be regenerated while two of them are functioning in different discharge modes. Preferably, each of the filters 67 is provided with a flow measuring device 83a, 83b, and 83c which is generally employed to equalize the flow through two or more of the same units when they are being operated in parallel. Similar flow control units 85a, 85b, and 85c are provided on the ion exchange units 75.

As the filtering media becomes "choked" with solids, a predetermined set point will be reached to discontinue operation of the "choked" filter and substitute a clean one. When the choked filter 67 is removed from service, it is placed in a backwash sequence which normally includes venting and draindown, air scour and a low and high backwash cycle. The sequence begins with the isolation of the filter 67 and opening of vent 93. Each of the filters 67 has a drain line 87 which is used to drain the filter water level to a level just below the filtering media prior to backwashing, and the filter draindown lines 87 lead to the mixing tank manifold pipe 57. Following closing of a valve 89 in the inlet line 65 and draining of the filter unit 67, the backwashing sequence is begun with an air scour step which is effected by opening a valve 91 in an air line and allowing air to flow upward through the filter and out the vent 93 provided in the inlet line.

Following the air scour the filter 67, receives a low and high rate backwash by opening the valve 95 in a line that enters the bottom of each filter unit just upstream of the flow control unit 83 to cause water to flow as backwash upward through the filter unit and out through a backwash effluent line which contains a valve 97 and also leads to the manifold pipe 57 to the tank 54 which may include a surge tank (not shown). Air flow is halted by closing the valve 91 before the high rate backwash. Thus, the arrangement allows one or more of the filter units 67 to be backwashed while the blowdown reduction system 49 is operating and without in any way detracting from the desired operation thereof.

A backwash influent line 101 containing a valve 103 joins the outlet line 77 at a location between the ion-exchange unit 75 and the flow measuring device 85 and provides for a backwash flow of water upward through each individual unit. During backwashing, a valve 105 in the inlet line 73 is closed, and the backwash effluent exits through a line 107 containing a valve which leads to the manifold pipe 57. Following backwashing, the ion-exchange resin is regenerated using a soluble sodium compound, preferably sodium chloride, which is pumped to the ion-exchange unit 75 via a branch line 109 containing a valve. The regeneration of the ion-exchange resin results in the replacement of the bivalent calcium and magnesium ions and any other ions which reach the ion-exchange units with sodium, and the discharge of these as soluble chlorides. Some residual ammonium ions are also removed during regeneration. The discharge during regeneration is directed through a line 111 leading to a separate treatment station designed to handle this relatively small flow equal to only about twice the bed volume of the unit 75 each time regeneration is carried out.

Following regeneration, a valve in a rinse line 113 is opened to rinse the regenerated unit with water prior to its reconnection into the operating blowdown reduction system. Because only very low ammonia levels are present in the rinse water, it is discharged through the line 81 leading to the blowdown discharge line 53.

Overall, in the blowdown reduction system 49, removal of suspended solids by the appropriate application of polyelectrolyte in the mixing tank 55 prolongs the life of an individual filter bed unit 67. The incorporation in the system of the filtering units 67 removes suspended material carried over from the clarifier 61 and prevents plugging and/or fouling of the ion-exchange units 75. Employment of the ion-exchange units 75 removes calcium and magnesium ions (the ions which give rise to scaling) from the water being treated and thus renders the ion-exchange-treated stream appropriate for reuse in the recirculation stream being supplied to the main off-gas processing system. Thus, whereas it was earlier necessary to discharge as blowdown a side stream about equal to the 3 to 8 volume percent of the circulating water, a significant portion (i.e., at least about 50%) of the side stream flowing through the line 47 is now returned to the overall off-gas processing system—thus significantly reducing the quantity of liquid being discharged as blowdown while still achieving the desirable objectives of blowdown, i.e. control of dissolved solids.

Of particular importance to the present blowdown reduction system 49 is the ability of the sodium cycle cation exchange resin to operate as an ammonium filter. The freshly regenerated ion-exchange resin attracts the monovalent ammonium ions during the first portion of its in-service use, and ammonium ions continue to be attracted until about 35 to 40% of the capacity of the ion-exchange resin has been expended. Indicative of this situation is an elevation of the pH of the effluent from the unit 75 above the pH of the influent which results from the removal of the ammonium ion and its replacement by the strongly basic sodium ion. During this period of time of ammonium-ion removal, the effluent from a particular ion-exchange unit is directed through the branch line 81 to the main blowdown line 53 for discharge. Because a very substantial percentage of the ammonium ions is being trapped on the ion-exchange resin, the amount of ammonia in the blowdown is substantially reduced, enabling stringent standards on ammonia discharge to be met while still achieving the necessary reduction in hardness.

After approximately the 35% capacity point has been passed, the bivalent ions are attracted to the sites and the ammonium ions which have been previously absorbed are shed to the liquid causing the concentration of ammonium ion in the stream leaving the ion-exchange unit to rise quite rapidly. Indicative of this situation is the occurrence of a substantial lowering of the pH of the effluent which continues until the pH drops slightly below the pH of the influent which is evidence of the removal of magnesium and calcium ions and their replacement by the weakly basic ammonium ions from the ion-exchange resin. Accordingly, subsequent to reaching about 35% of capacity of the resin, the discharge from a particular ion-exchange unit 75 is switched to flow through the branch line 79 back to the return line 51. By appropriately staging the operation of the individual units 75, one unit may be discharging to blowdown, while another unit is discharging to the return line 51 and while still another unit is being regenerated.

The operation of the ion-exchange units 75 is preferably monitored by a control unit 121 including a pH meter having a probe 123 in the head tank 71 and pH meters having probes 125a, 125b and 125c in the discharge lines 77 from each of the units. It has been found that the pH of the effluent will measure about 8 to 10% above the pH of the influent during the early portion of the in-service life of a regenerated charge of resin, e.g., during the flow therethrough of an amount of liquid equal to about 20 times the volume of the ion-exchange bed. The pH will then begin to slowly decrease. After the flow reaches about 25 volumes, the pH will begin to drop quite rapidly back to and eventually below the pH of the influent. Thus, the control unit 121 which receives the signal from the pH monitor can be designed to detect either an increase in the rate of change in the decreasing pH value or a decrease to a predetermined absolute or relative (to the pH of the tank 71) pH value and to appropriately open the valve in the return branch line 79 and close the valve in the discharge branch line 81 to appropriately direct the effluent from the ion-exchange unit 75 to the desired destination when the ammonia concentration rises. For example, control unit 121 can be set to automatically open and close these valves when the decreasing pH reaches a predetermined value, e.g. about 0.2 above the pH of the tank 71.

It has also been found that even if the resin is used to substantially complete exhaustion before being regenerated, all of the ammonium is not displaced from the resin during the service cycle. Accordingly, when the ion-exchange resin bed is being regenerated, the ammonium concentration of the effluent is quite high and should be treated separately. Regeneration with NaCl requires an amount of water about equal to twice the bed volume, and this quantity is directed through the line 111 to a separate treatment facility where if desired, the ammonia can be recovered. For example, the effluent can be fed to an ammonia still that may be already in existence as part of a coke plant. This amount is less than about 3% of the liquid that passes through the ion-exchange units 75.

The use of the ion-exchange units 75 in the fashion described above is of particular importance to a blast furnace operation that would normally produce a relatively high ammonium concentration in the blowdown discharge. The invention not only lowers the ammonium concentration in the blowdown stream, but it has the added feature of reducing the transfer of the fairly soluble ammonia from the off-gas because the concentration of ammonium ion is built up in the recirculating water stream. As a result, the ammonium ion reaches a substantial equilibrium level and remains at about that level. The concentration of other contaminants, such as fluorides, cyanides and phenols, which might reasonably be expected to undesirably build up to troublesome concentrations when the percentage of blowdown is reduced, surprisingly also reach equilibrium at lower concentrations within the water being recirculated, and their mass discharge is also substantially reduced. As previously indicated, the formation of complex cyanide compounds, which precipitate along with the heavy metals in the settling tank 61 of the blowdown reduction system, significantly reducing its concentration in the blowdown; however, the presence of cyanide in the recirculating water appears to reduce its initial dissolution. Moreover, the return of a substantial portion (i.e., 50 to 65%) of the treated side stream to the recirculating stream reduces the quantity of makeup water and the overall demand of the off-gas processing system for fresh water—another significant advantage.

Although the invention has been described with regard to certain preferred embodiments which constitute the best mode presently known to the inventors, it should be understood that various changes and modifications as would be obvious to one having the ordinary skill in this art may be made without departing from the scope of the invention which is defined solely by the appended claims.

Various features of the invention are emphasized in the claims that follow.

What is claimed is:

1. A method for treating off-gas produced by a blast furnace containing particulate solids and water-soluble contaminants including heavy metals, ammonia, calcium and magnesium, which method comprises
   scrubbing the gas with water to remove particulate solids and dissolve said contaminants,
   settling solids from liquid effluent from said scrubbing,
   cooling the liquid effluent following said settling,
   recirculating a major portion of said cooled effluent for another pass through said scrubbing step,
   chemically treating a minor portion of said cooled effluent and precipitating ions of said heavy metals as sludge,
   treating said effluent from said scrubbing, settling, cooling and precipitating steps with a cation exchange resin in a sodium cycle to remove calcium, magnesium and ammonium ions, and
   returning a substantial part of said ion-exchange-treated effluent to said scrubbing step and discharging another substantial part thereof as blowdown.

2. A method in accordance with claim 1 wherein effluent from said precipitating step is filtered prior to ion-exchange treatment, wherein said ion-exchange treated effluent is discharged to blowdown during an initial period of treatment by a given charge of ion-exchange resin while ammonium ions are being removed from solution and the pH of the effluent is elevated and wherein said ion-exchange treated effluent is returned for recirculating to said scrubbing step during a subsequent period of treatment by said given charge when the pH of said effluent is decreasing and ammonium ions are being shed from the ion-exchange resin.

3. A method in accordance with claim 2 wherein backwashing of the filtering is periodically carried out and the backwashing effluent is returned to said settling step.

4. A method in accordance with claim 1 wherein aeration is carried out prior to said chemical treatment and alkali metal hydroxide is added during said chemical treatment to control hardness resulting from the presence of ions of calcium and magnesium.

5. A method in accordance with claim 4 wherein said off-gas also includes water-soluble cyanide and wherein a soluble ferric compound is added during said chemical treatment which complexes and precipitates cyanide ion.

6. A method in accordance with claim 5 wherein the pH of the liquid is adjusted to between about 8.5 and about 9 during said chemical treatment and wherein the effluent from said precipitating contains not more than about 20 mg/l of solids.

7. A method in accordance with claim 2 wherein said given charge of ion-exchange resin is backwashed, regenerated and then rinsed and wherein the effluent from said backwashing is returned to said precipitating step and effluent from said rinsing is discharged as part of the blowdown.

8. A method in accordance with claim 7 wherein effluent from said regeneration step is treated separately to recover ammonia therefrom.

9. A method in accordance with claim 1 wherein said minor portion constitutes between about 3 and about 8% of said cooled effluent.

10. A method in accordance with claim 2 wherein the pH of said ion-exchange treated effluent is monitored and wherein the discharge of said effluent to blowdown is automatically halted and directed to said scrubbing step when said pH decreases to a predetermined value.

11. A method in accordance with claim 2 wherein at least about 50% of said minor portion is returned and wherein said ion-exchange and chemical treatment is such that scaling during scrubbing is not a problem.

12. A system for treating off-gas produced by a blast furnace, which system comprises,
  means for scrubbing the gas with water,
  thickener means for removing sludge from the liquid effluent from said scrubbing means,
  means for cooling the liquid effluent from said scrubbing means,
  means communicating with said cooling means for reciculating a major portion of said effluent for another pass through said three aforementioned means, and
  blowdown reduction means also communicating with said cooling means for treating the remainder of said effluent which includes
  means for chemical treatment of said effluent from said cooling means and for precipitation of heavy metals as sludge,
  means in communication with said chemical treatment means for treating said chemically treated effluent with a sodium cycle cation exchange resin, and
  means in communication with said ion-exchange-treating means for returning a substantial part of said ion-exchange-treated effluent to said scrubbing means and for discharging another substantial part thereof as blowdown.

13. A system in accordance with claim 12 wherein said scrubbing means includes a venturi scrubber and wherein gas cooling means is connected with said scrubber for treating the exit stream of gas from said scrubbing means and means is connected with said gas cooling means for supplying liquid effluent from said gas cooling means to said scrubbing means.

14. A system in accordance with claim 12 wherein means is connected to the inlet to said chemical treatment means for aerating said remainder of said effluent prior to its reaching said chemical treatment means.

15. A system in accordance with claim 12 wherein means is connected to said precipitation means for filtering the effluent from said precipitation means prior to its being supplied to said ion-exchange treatment means.

16. A system in accordance with claim 12 wherein means is provided for discharging said ion-exchange treated effluent to blowdown while ammonium ions are being removed therefrom by a given charge of ion-exchange resin.

17. A system in accordance with claim 12 wherein a plurality of ion-exchange units are provided which are staged so that the bed of ion-exchange resin in each unit is at a different stage of in-service life, wherein means is provided for monitoring the pH of the effluent from each of said units and wherein a control unit is provided for directing the effluent from a unit to blowdown during initial bed life when the pH is elevated and for automatically diverting said effluent to said recirculating means when said effluent pH decreases to predetermined value.

* * * * *